(No Model.)
W. E. ABBOTT.
CORN HARVESTER.
No. 504,188. Patented Aug. 29, 1893.
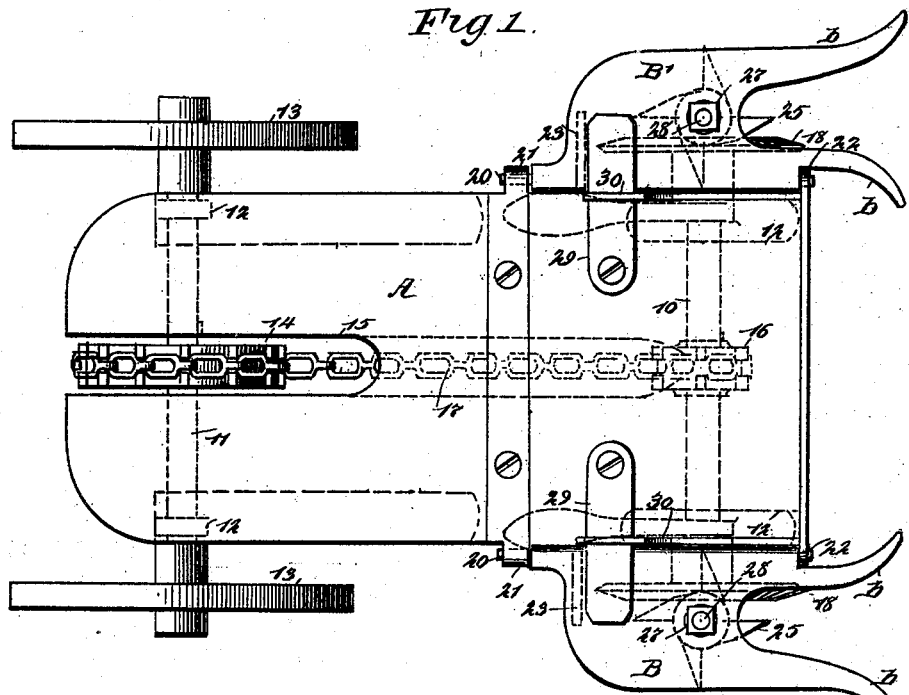
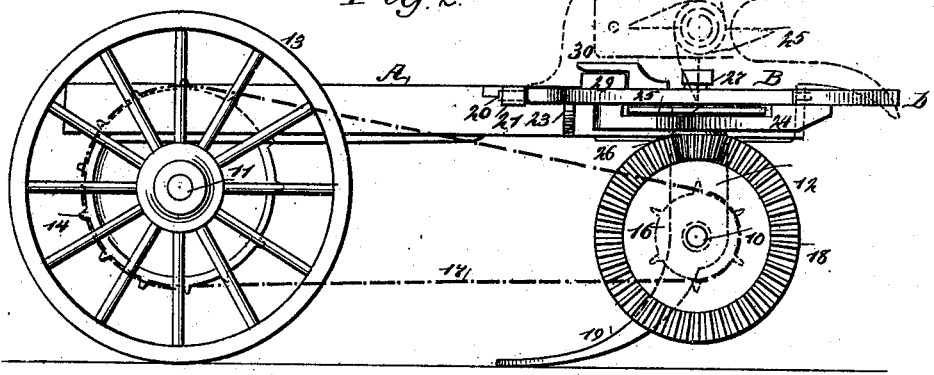
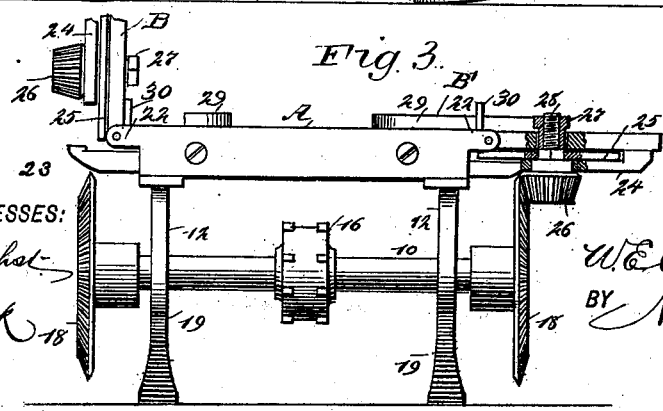
WITNESSES:
Paul Jahst
C. Sedgwick
INVENTOR
W. E. Abbott
BY Munn & Co
ATTORNEYS.

UNITED STATES PATENT OFFICE.

WARREN ELLSWORTH ABBOTT, OF EAST MONROE, OHIO.

CORN-HARVESTER.

SPECIFICATION forming part of Letters Patent No. 504,188, dated August 29, 1893.

Application filed February 25, 1893. Serial No. 463,702. (No model.)

*To all whom it may concern:*

Be it known that I, WARREN ELLSWORTH ABBOTT, of East Monroe, in the county of Highland and State of Ohio, have invented a new and Improved Corn-Harvester, of which the following is a full, clear, and exact description.

My invention relates to an improvement in corn harvesters of that type adapted to harvest standing corn planted in rows at various distances apart; but the invention relates more particularly to the construction of corn harvesters adapted to operate upon standing corn planted at uniform distances apart.

The object of the invention is to provide a machine of exceedingly simple yet durable construction, and to construct the machine with side tables capable of being raised or lowered, and to provide the tables with guide fingers and with rotary cutters whereby corn may be cut expeditiously and in a perfect manner whether the corn is presented to the cutter in an upright position or in an inclined position, or whether the roots of the corn have been destroyed by grub worms or the corn stalks are tough or withered.

Another object of the invention is to provide a means for driving the rotary knives from the supporting wheels of the machine and in such manner that the knives may be expeditiously and conveniently thrown out of gear with their driving mechanism, and whereby further the cutters may be thrown out of the path of a predetermined number of stalks, permitting these stalks to stand as supports for the shocks.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the machine, illustrating the guide tables in position to receive standing corn and to cut the corn by the cutters carried by the tables. Fig. 2 is a side elevation of the machine, the tables being shown in an inoperative position in dotted lines; and Fig. 3 is a front elevation of the machine, one of the tables being elevated and the other horizontally located, the horizontal table being in section.

In carrying out the invention a platform A, is mounted upon the front and rear axles 10 and 11, the axles being journaled in hangers 12, projected vertically downward from the platform near its corners. The rear axle carries two supporting wheels 13, adapted to travel upon the ground, the wheels being keyed or otherwise firmly secured to the axles; and at the center of the rear axle a pulley is located preferably in the shape of a sprocket wheel 14, and if the platform is, as shown in the drawings, quite close to the axle, the platform is provided with a recess 15, through which the sprocket wheel may be projected upwardly. The forward axle 10, is driven from the rear axle, the driving mechanism consisting of a sprocket wheel 16, which is fast upon the forward axle 10, preferably at its center, and a chain belt 17, connecting the rear sprocket wheel 14 with the sprocket wheel 16. The forward axle is provided at each end with a beveled gear 18, the gears being firmly attached to the axle; and the gears are prevented from engaging with the ground over which the machine is made to travel by shoes 19 projecting downward from the hangers, which shoes are curved downwardly and rearwardly, as is shown best in Fig. 2. Usually no supporting wheels are located at the front of the machine, the shoes 19, giving support to that section, but if in practice it is found desirable the axle may be supplied with supporting wheels and the shoes be omitted.

At the front of the machine, upon each side thereof, a table is pivotally attached, the tables being designated in the drawings one as B and the other as B'. The tables are identical in construction and are preferably made of metal, being provided at their ends near their inner sides with trunnions 20, the said trunnions being journaled in bearings 21, attached to the platform and extending beyond the sides thereof, and likewise through the medium of boxes 22, located at the front of the machine and also projecting beyond its sides. The tables may be given any shape that fancy may dictate; preferably, however, the rear ends of the tables are somewhat curved or given a cylindrical shape, while the bodies of the tables are somewhat rectangular in cross section; but the forward ends of the tables are bifurcated, forming thereby two guide arms b for each table, and these guide arms extend some distance beyond the front edge of the platform, as shown in Fig. 1, and are curved in opposite directions, the center of the space between the two guide fingers of a table being practically on a central longitudinal line of the table. The tables when in working position are adapted to stand in a horizontal position, and to that end one or more bracket arms 23, are projected from the sides of the platform upon which the tables rest when in their operative position. Each table is provided upon its under face with a bracket 24, said brackets being located adjacent to the bifurcated ends of the tables, and between the bracket and body of each table a rotary cutter 25, is pivoted, the cutter being preferably of stellated shape, comprising a series of cutting arms or blades radiating from a central hub. The cutters are so located that when they are rotated their cutting arms or members will pass successively across the inner end of the space between the guide arms of the platform to which the cutters belong. The cutters are driven by being each connected with a beveled pinion 26, and the beveled pinions are so located that they mesh with the beveled gears 18 of the front axle. Thus as long as the tables are in a horizontal position the pinions will be in engagement with the gears on the front axle, and will be driven as the machine advances; but the moment that a table is raised the driving connection between the cutter of the table and the forward axle is broken. The manner in which the beveled pinions 26 are connected with the cutters, and likewise the manner in which the cutters are pivoted or fulcrumed, is somewhat peculiar, and forms a feature of the invention.

The construction is shown best in Fig. 3, in which it will be observed that a nut 27, is made in two diameters, namely a body and a head. The head is polygonal in general contour in order that it may be turned by a wrench; and the body of the nut is held to turn in a suitable aperture made in the table. Thus the nut will serve as a journal or bearing for a vertical shaft 28, one end of which shaft is screwed into the nut, the pinion 26, being attached to the opposite or lower end of the shaft by being keyed, or in any other approved manner, while that portion of the shaft between the bracket in which the hub of the pinion is journaled and the under face of the bracket is made polygonal in cross section, and the hub of the cutter to be driven by the pinion is provided with a similarly shaped opening to receive that section of the shaft. By this construction it is evident that the shaft may be removed at any time by removing the nut 27, and that the cutter may then be taken out from between the bracket and table and sharpened or repaired as may be found necessary.

In order that the tables shall be held firmly in a horizontal position when the machine is to be used for cutting corn stalks, two buttons or levers 29, are pivoted at or near their inner ends upon the top of the platform, and these buttons or levers are adapted to be carried over the tables, as shown in Figs. 1 and 2, and under keepers 30, located upon the side edges of the platform adjacent to the tables.

In operation the machine is adapted to be drawn by a single horse between two rows of corn stalks, which when the tables are in their horizontal position will cause the stalks to enter the forward or guide openings in the table and be acted upon by the cutters. As the machine is drawn forward the forward axle is revolved from the rear one, and from said axle the knives are given a rotary movement, and as the stalks are successively presented to them, no matter in what condition the stalks may be, they will be properly cut, since the cutting motion is a rotary one and the cutters will pass through the stalks whether the roots are entirely or almost out of the ground, and whether the stalk be exceedingly tough or withered, which action could not be obtained if a reciprocating knife were employed, working with a shear cut. If it is desired to cut corn at one side only of the machine but one table is carried downward to its horizontal or cutting position, and whenever it is desired to leave a stalk standing to form a support for a shock to be formed, the table is thrown upward before that stalk is reached and is not lowered until the table has passed by that stalk.

In operating the machine two men are usually expected to stand upon the platform and receive the corn as cut; and when a sufficient amount of corn stalks has accumulated upon the platform, or a given number of stalks, the machine may be stopped and the cut corn shocked upon the ground.

The machine is exceedingly simple and durable and is capable of being effectively worked, the rotary cutters enabling it to operate successfully upon stalks of all descriptions. Furthermore, it is evident that the tables and cutters may be expeditiously and conveniently thrown in or out of gear, or raised or lowered, as when it is desired to stop the revolution of a cutter it is only necessary to elevate the table a sufficient distance to carry the driving pinion of that cutter out of engagement with the driving gear of the front axle.

Having thus described my invention, I claim as new and desire to secure by Letters Patent—

1. In a corn harvester, the combination, with a table pivoted longitudinally to a side of the machine, of a rotatable cutter carried by the table and a driving gear carried by the machine and the cutter spindle, said driving gear being constructed to rotate the cutter when the table is in an essentially horizontal position, the cutter being adapted to be thrown out of gear by carrying upward the table, as and for the purpose set forth.

2. In a corn harvester, the combination, with a platform, and a table pivotally connected with a side of the platform, the table being provided with guide arms at one of its ends, of a cutter carried by the table and mounted to revolve across the space between the guide arms, a gear connected with the cutters, and a driving mechanism carried by the platform and adapted to connect with the said cutter gear, whereby the cutter may be silenced by carrying upward the table, as and for the purpose set forth.

3. In a corn harvester, the combination, with a platform and a driving mechanism connected with the platform, of a pivoted table provided with guide arms between which the corn stalks are passed, a locking device carried by the platform and engaging with the table, a cutter mounted upon the table, and a driving connection between the cutter shaft and the driving mechanism on the platform, as and for the purpose specified.

4. In a corn harvester, the combination, with a platform provided with front and rear axles, supporting wheels located upon the rear axle, a driving connection between the front and rear axles, driving gears mounted upon the front axle, feet projected downwardly and rearwardly from the platform near the front axle, of tables pivotally connected with the forward side portions of the platform, a locking device carried by the platform and adapted for engagement with the table, guide arms located at the forward ends of the tables, cutter shafts journaled in the tables, cutters mounted upon said shafts, and a gear connection between the cutter shafts and the driving gears of the forward axle, as and for the purpose set forth.

WARREN ELLSWORTH ABBOTT.

Witnesses:
W. H. MASON,
GEO. E. SIMMONS.